(12) United States Patent
Foster et al.

(10) Patent No.: US 9,055,097 B1
(45) Date of Patent: Jun. 9, 2015

(54) SOCIAL NETWORK SCANNING

(71) Applicant: ZeroFOX, Inc., Baltimore, MD (US)

(72) Inventors: James C. Foster, Baltimore, MD (US); Christopher B. Cullison, Westminster, MD (US); Robert Francis, Baltimore, MD (US); Evan Blair, Baltimore, MD (US)

(73) Assignee: ZeroFOX, Inc., Baltimore, MD (US)

( * ) Notice: Subject to any disclaimer, the term of this patent is extended or adjusted under 35 U.S.C. 154(b) by 0 days.

(21) Appl. No.: 14/218,522

(22) Filed: Mar. 18, 2014

Related U.S. Application Data (60) Provisional application No. 61/798,917, filed on Mar. 15, 2013, provisional application No. 61/799,115, filed on Mar. 15, 2013, provisional application No. 61/799,610, filed on Mar. 15, 2013.

(51) Int. Cl.
*H04L 29/06* (2006.01)

(52) U.S. Cl.
CPC .................................. *H04L 63/1433* (2013.01)

(58) Field of Classification Search
CPC .................................................. H04L 63/1433
USPC .......................................................... 726/26
See application file for complete search history.

(56) References Cited

U.S. PATENT DOCUMENTS

| | | |
|---|---|---|
| 8,225,413 B1 | 7/2012 | De et al. |
| 8,234,168 B1 | 7/2012 | Lagle Ruiz et al. |
| 8,484,744 B1 | 7/2013 | De et al. |
| 8,655,899 B2 * | 2/2014 | Kenedy et al. ................. 707/758 |
| 8,732,455 B2 * | 5/2014 | Wong et al. ..................... 713/154 |
| 8,782,080 B2 * | 7/2014 | Lee et al. ....................... 707/771 |
| 8,909,646 B1 * | 12/2014 | Fabrikant et al. ............. 707/737 |
| 2006/0168066 A1 | 7/2006 | Helsper et al. |
| 2008/0177834 A1 * | 7/2008 | Gruhl et al. ................... 709/204 |
| 2008/0196099 A1 | 8/2008 | Shastri |
| 2008/0262877 A1 | 10/2008 | Hargroder |
| 2008/0300964 A1 | 12/2008 | Raghunandan |
| 2010/0174813 A1 * | 7/2010 | Hildreth et al. ............... 709/224 |
| 2011/0191200 A1 | 8/2011 | Bayer |
| 2012/0030732 A1 | 2/2012 | Shaty |
| 2012/0047560 A1 | 2/2012 | Underwood et al. |
| 2012/0047581 A1 | 2/2012 | Banerjee et al. |
| 2012/0159647 A1 | 6/2012 | Sanin |
| 2012/0167231 A1 | 6/2012 | Garcia et al. |
| 2012/0191594 A1 * | 7/2012 | Welch et al. .................... 705/38 |

(Continued)

FOREIGN PATENT DOCUMENTS

CN 102662950 9/2012

OTHER PUBLICATIONS

A new conceptual framework for Social Protection, and beyond|http://info.worldbank.org/etools/docs/library/80363/conceptfram.pdf|pp. 1-30|ROBERT HOLZMANN|2000.*

(Continued)

*Primary Examiner* — Mahfuzur Rahman
(74) *Attorney, Agent, or Firm* — Fish & Richardson P.C.

(57) ABSTRACT

A method includes identifying data on a social network that is associated with a social entity, and determining one or more characteristics of the identified data. A reference to the identified data is generated for each of the one or more characteristic and the one or more references to the identified data is stored in one or more databases that are accessible to a security analysis engine.

18 Claims, 3 Drawing Sheets

(56) References Cited

U.S. PATENT DOCUMENTS

| | | |
|---|---|---|
| 2012/0296845 A1 | 11/2012 | Andrews |
| 2013/0110802 A1 | 5/2013 | Shenoy et al. |
| 2013/0268357 A1* | 10/2013 | Heath .................... 705/14.53 |
| 2013/0339186 A1 | 12/2013 | French et al. |
| 2014/0067656 A1* | 3/2014 | Cohen Ganor et al. ........ 705/39 |
| 2014/0123632 A1 | 5/2014 | Shibuya et al. |
| 2014/0129632 A1 | 5/2014 | Sutton et al. |
| 2014/0137257 A1* | 5/2014 | Martinez et al. ............. 726/25 |
| 2014/0208424 A1 | 7/2014 | Hudack et al. |

OTHER PUBLICATIONS

Office Action issued in U.S. Appl. No. 13/842,716 on Aug. 13, 2014, 12 pages.

Office Action issued in U.S. Appl. No. 14/327,068 on Aug. 12, 2014, 12 pages.

Office Action issued in U.S. Appl. No. 14/445,274 on Sep. 11, 2014, 11 pages.

Office Action issued in U.S. Appl. No. 14/445,203 on Sep. 18, 2014, 8 pages.

Office Action issued in U.S. Appl. No. 14/327,068 on Jan. 26, 2015, 18 pages.

Notice of Allowance issued in U.S. Appl. No. 14/445,203 on Feb. 11, 2015, 7 pages.

Office Action issued in U.S. Appl. No. 14/566,971 on Feb. 13, 2015, 23 pages.

Ofice Action issued in U.S. Appl. No. 13/842,716 on Mar. 23, 2015, 22 pages.

Kontaxis et al., "Detecting Social Network Profile Cloning" http://ieeexplore.ieee.org/stamp/stannp.jsp?tp=&arnumber=5766886&tag=l, pp. 295-300, 2011.

Tchuente et al., "A Community Based Algorithm for Deriving Users' Profiles from Egocentrics Networks" http://ieeexplore.ieee.org/stamp/stamp.jsp?tp=&arnumber=6425752i, 2012, pp. 266-273, 2012.

\* cited by examiner

SOCIAL NETWORK SCANNING

CROSS-REFERENCE TO RELATED APPLICATIONS

This application claims priority from U.S. Provisional Application No. 61/798,917, filed Mar. 15, 2013, and titled "Social Threat Assessment," U.S. Provisional Application No. 61/799,115, filed Mar. 15, 2013, and titled "Social Threat Scores," and U.S. Provisional Application No. 61/799,610, filed Mar. 15, 2013, and titled "Social Threat Alerts." All of these prior applications are incorporated by reference in their entirety.

FIELD

The present application relates to computer security.

BACKGROUND

Traditional approaches to combatting cyber threats focus on securing endpoints and networks through reactive security measures that are focused on securing computing devices. Anti-virus programs, for example, can be used to detect malicious software associated with local system-level attacks (e.g., a virus attached to an email) and, when defenses have already been breached, to quarantine dangerous files that are detected within a computer system. Firewalls and other edge security devices can be used to establish a perimeter around sensitive systems by controlling the passage of information between networks, so as to reduce the risk of unauthorized access.

Modern cyber threats, however, evolve alongside computer technology, and attackers can be expected to leverage whatever means are available in order compromise or bypass traditional defenses. The development and expansion of social media, for instance, has introduced significant information security risk to both individuals and organizations. These risks include targeted social-based cyber-attacks, fraud, impersonations, and social engineering. The evolving risk necessitates security technology that is predictive rather than reactive in nature, and that identifies dormant maliciously-minded entities before they can do damage.

SUMMARY

In one aspect, data on a social network that is associated with a social entity is identified, and one or more characteristics of the identified data are determined. A reference to the identified data is generated for each of the one or more characteristics and one or more references to the identified data is stored in one or more databases that are accessible to a security analysis engine.

In another aspect, the one or more references stored in the one or more databases is assessed by the security analysis engine and a social risk score for the social entity is generated based on the assessment. Comparing the social risk threshold to the social risk score for the social entity and initiating a security action if the social risk score exceeds the social risk threshold. Initiating the security action can include providing an alert to a user.

In yet another aspect, an association between the social entity and the identified data can be identified based on the associated data originating with, or was supplied, created, or referenced by, the social entity.

In a further aspect, the characteristics of the data that determined from the identified data are contextual, lexical, visual, audio, profile, URL, network, destination content, domain, host, and application characteristics.

In yet another aspect, data associated with the social entity is received from a third party. The data associated with the social entity is received through an application programming interface (API).

Other implementations of these aspects include corresponding systems, apparatus, and computer programs, configured to perform the described techniques, encoded on computer storage devices.

The details of one or more implementations of the subject matter described in this specification are set forth in the accompanying drawings and the description below. Other potential features, aspects, and advantages of the subject matter will become apparent from the description, the drawings, and the claims.

DESCRIPTION OF DRAWINGS

Like reference symbols in the various drawings indicate like elements.

DETAILED DESCRIPTION

Predictive and active social risk management technology reduces the risks posed to individuals and enterprises by cyber threats that target and exploit the social vector. Traditional approaches to combating cyber threats focus on endpoint and perimeter security, providing reactive protection through, for example, anti-virus software, email and web gateways, firewalls, and intrusion detection systems. Online risks have evolved, however, and attacks now leverage social network and social media communications as means of bypassing traditional protections. The evolving risk necessitates security technology that is predictive and active rather than reactive in nature, and that identifies dormant malicious entities before they can launch an attack.

In more detail, an active social risk defense engine that identifies live attacks can be paired with a predictive analysis framework that identifies dormant risks before attacks occur. The predictive analysis framework can be driven by a scoring algorithm that can determine and score a risk posed by a social entity by analyzing characteristics of a target URL, file, or social communication that is associated with the social entity. The framework can analyze the target via a variety of analytical factors, and can dynamically determine which factors to employ, where each factor employed by the algorithm is associated with one or more characteristics of the target and/or social entity. Based on the result of analysis, the algorithm can score the risk posed by the social entity, and can recommend or take appropriate security action based on a comparison of the social risk score to a social risk threshold.

Figure 1:
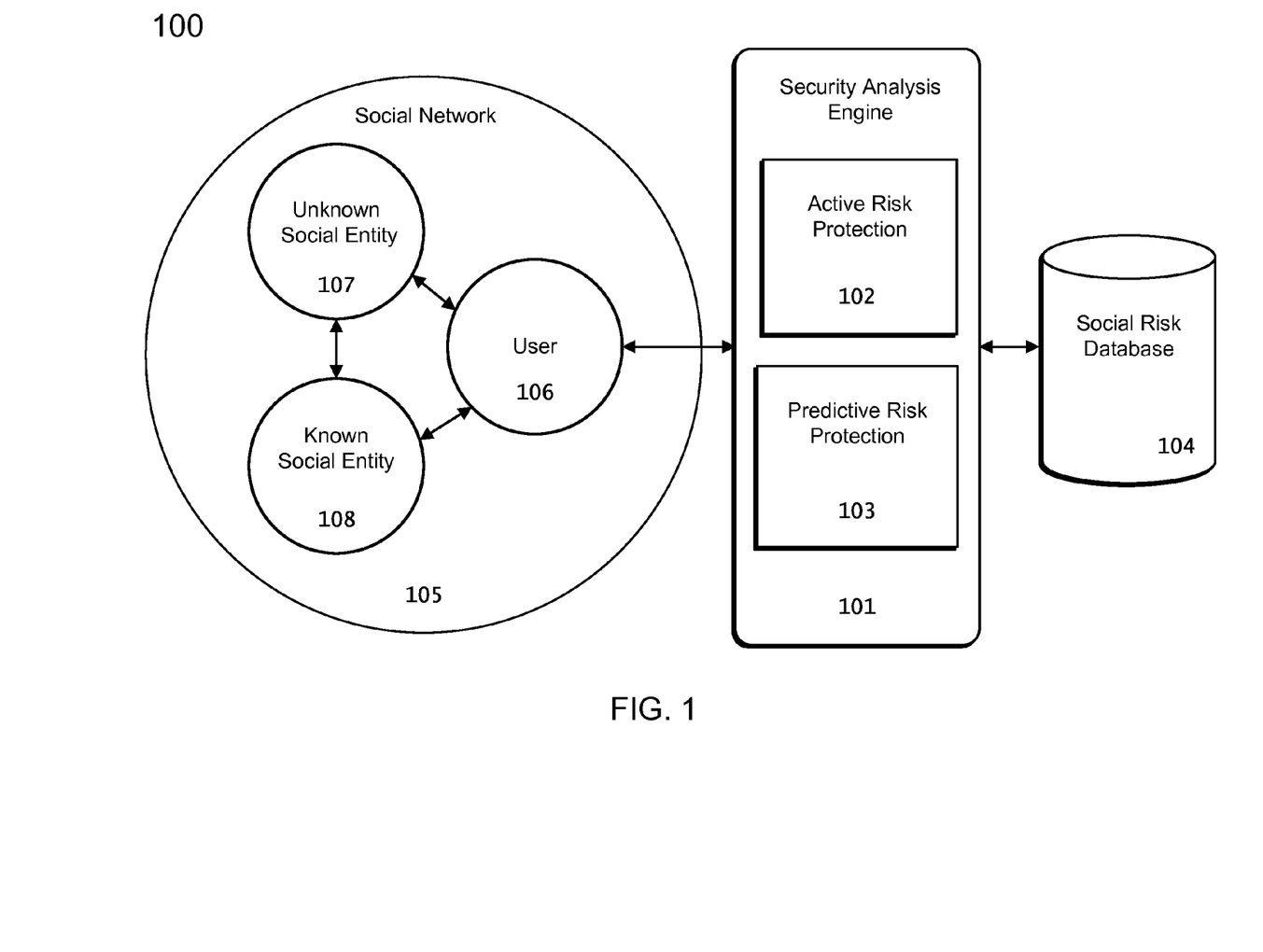
FIG. 1 is a diagram of an example of a system that provides security against social risks.

FIG. 1 is a diagram of an example of a system that provides security against social risks, which include threats posed by social entities. The system 100 includes a security analysis engine 101 that includes an active risk protection module 102 and a predictive risk protection module 103, as well as a social risk database 104. The security analysis engine 101 and social risk database 104 may be used to provide security against risks arising from social network 105, such as risks posed to a user 106 by unknown social entity 107 and/or known social entity 108. Security analysis engine 101, social risk database 104, and user 106 may be connected through a network, such as the Internet, and user 106, unknown social entity 107 and known social entity 108 may communicate or may otherwise be connected through social network 105. The active risk protection module 102 and the predictive risk protection module 103 of security analysis engine 101 may be implemented using a single computer, or may instead be implemented using two or more computers that interface through the network. Similarly, security analysis engine 101 and social risk database 104 may be implemented using a single computer, or may instead be implemented using two or more computers that interface through the network.

Active risk protection module 102 of security analysis engine 101 may be used to protect user 106 from immediate security risks by, for example, thwarting live attacks. In more detail, either of unknown social entity 107 or known social entity 108 may attempt to communicate with, or connect to, user 106. In response to an attempt by a social entity at communication or connection with user 106, active risk protection module 102 may identify a URL, file, or social communication associated with the social entity, and may initiate a security action after performing an analysis related to the identified URL, file, or social communication.

In more detail, Uniform Resource Locators function as addresses that are used, for example, to specify the location of documents on the World Wide Web. An individual URL, which may be referred to as a web address, is a specific character string that references (i.e. provides the location of) a resource. For example, http://zerofox.com references the homepage of ZeroFOX, a cyber-security technology company. Risk protection module 102 may identify an association between a social entity and a URL when, for example, the source of the URL is a social communication originating with the social entity, or when the URL references a social network profile of the social entity. A social communication may be, for example, a post on a social network, or a message sent between users of a social network.

Risk protection module 102 may determine, based on the URL associated with the social entity attempting to connect to or communicate with user 106, that the social entity is a known entity, such as known social entity 108. The determination may involve, for example, identifying an entry in social risk database 104 that is associated with the social entity, the entry including the URL and a social risk score for the social entity. Alternatively, risk protection module 102 may determine, based on, for example, an absence of an entry associated with the social entry in social risk database 104, that the social entity is an unknown entity, such as unknown social entity 107. The determination may involve, for example, identifying an identity as a known entity only for a specific period of time. Prior to the expiration of the specified period of time, a social entity that was scanned and identified as a known entity will be considered to be a known entity, while after the expiration it will again be considered to be an unknown entity.

In response to determining that the social entity attempting to connect to or communicate with user 106 is a known entity, risk protection module 102 may identify the social risk score that is associated with the social entity, and may recommend or take appropriate security action based on a comparison of the social risk score to a social risk threshold.

A social risk score is a calculation of the security risk associated with a target URL, file, or social communication and thus, the risk posed by a scored social entity that is associated with the target. Social risk scores may be determined by the predictive risk protection module 103 of security analysis engine 101, which may proactively identify online risks and cyber threats, before attacks occur. The predictive risk protection module 103 may be driven by a scoring algorithm that can determine and score a risk posed by a dormant social entity by analyzing a target URL, file, or social communication that is associated with the social entity, prior to a user's engagement with the social entity. The social risk scores determined by the predictive protection module 103 may be associated with corresponding URLs in entries that are generated by security analysis engine 101, and that are stored in social risk database 104.

A variety of analytical factors can be used by the scoring algorithm to analyze a target URL, file, or social communication, where each factor employed by the algorithm is associated with one or more characteristics of the target and/or the social entity associated with the target. The characteristics of the target and/or social entity that may be analyzed by the scoring algorithm include contextual, lexical, visual, audio, profile, URL, file, network, destination content, domain, host, and application characteristics. The algorithm may analyze, for example, content of a resource that is referenced by a target URL, such as a social network profile of the social entity that is referenced by the target. The algorithm may analyze the content or function of a target file, and/or the type, size, or attributes of the target file.

The algorithm may dynamically determine which factors to employ in analyzing a target URL, file, or social communication. The algorithm may, for example, assign a confidence level to a social risk score that is determined based on a first set of factors and, if the confidence level falls below a confidence threshold, the algorithm may refine the social risk score based on one or more additional sets of factors, until the confidence level assigned to the social risk score meets or exceeds the confidence threshold.

A social risk threshold represents a level of tolerance for risk, and a particular social risk threshold may be associated with a particular user, organization or entity. Security analysis engine 101 may assign a social risk threshold to a user, organization, or entity based on, for example, input from the user, or one or more characteristics of the user, user's social network activity, and/or a collection of users associated with the organization or entity.

When the risk protection module 102 determines that the social entity attempting to connect to or communicate with user 106 is a known entity, the risk protection module 102 may identify the social risk score that is associated with the social entity based on entry in social risk database 104, and may recommend or take appropriate security action based on a comparison of the social risk score to the user 106's social risk threshold. The risk protection module 102 may, for example, alert the user to the potential risk posed by the social entity, and/or block the social entity's communication or connection attempt.

When, on the other hand, the risk protection module 102 determines that the social entity attempting to connect to or communicate with user 106 is an unknown entity, the risk protection module 102 may use the scoring algorithm to generate a social risk score for the unknown entity, and may store the generated social risk score in a new entry in the social risk database 104, the new entry including the URL associated with the unknown entity and/or characteristics of the social entity or user. The risk protection module 102 may then recommend or take appropriate security action based on a comparison of the social risk score to the user 106's social risk threshold.

The predictive risk protection module 103 may, in addition to proactively determining social risk scores, alert the user 106 to risks posed by other social entities based on entries in social risk database 104. The predictive risk protection module 103 may, for example, alert the user 106 to risks posed by social entities with which user 106 has had no contact. For example, the risk protection module 103 may identify a connection between user 106 and known social entity 108, in addition to a connection between known social entity 108 and another social entity in social network 105. An entry in social risk database 104 may indicate that the social risk score for known social entity 108 falls below user 106's social risk threshold, but another entry may indicate that the social risk score associated with the social entity with which user 106 has had no contact exceeds user 106's social risk threshold. In cases like this, the predictive risk protection module 103 may, based on a comparison between a social entity's social risk score and a user's social risk threshold, initiate a security action relating to the social entity, even before the social entity attempts to connect to or communicate with the user.

Figure 2:
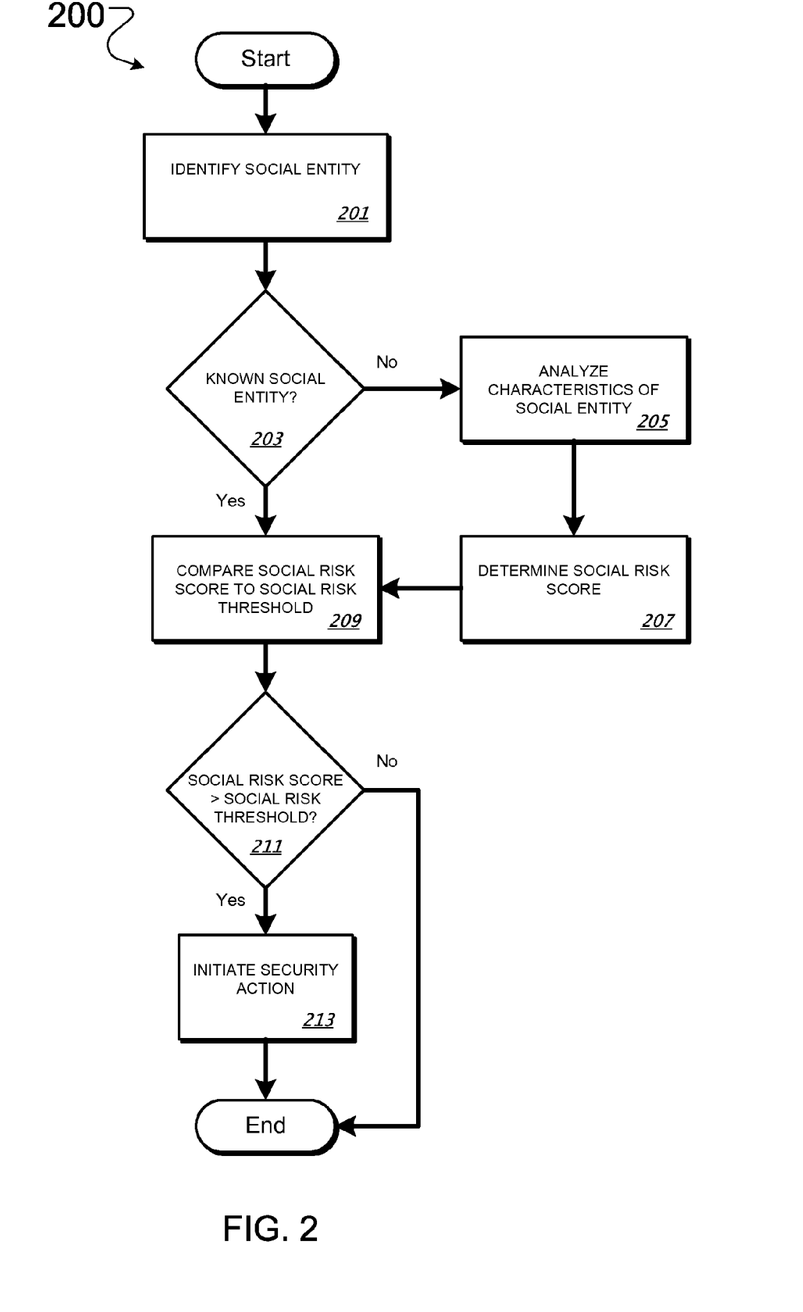
FIG. 2 is a flowchart of an example of a process for determining a social risk score for a social entity, and for taking an appropriate security action based on the determined social risk score.

FIG. 2 is a flowchart of an example of a process 200 for determining a social risk score for a social entity, and for taking an appropriate security action based on the determined social risk score. The process 200 may be implemented, for example, using system 100, although other systems or configurations may be used. In such an implementation, one or more parts of the process may be executed by security analysis engine 101, which may interface with other computers through a network. Security analysis engine 101 may retrieve data involved in the process, such as data used in assessing a security risk posed by a social entity, from one or more local or remote data sources, such as social risk database 104 and user 106.

Process 200 begins when security analysis engine 101 identifies a social entity based on a URL that is associated with the social entity (201). The social entity may be identified, for example, by active risk protection module 102, in response to an attempt by the social entity to connect to or to communicate with user 106. Alternatively, the social entity may be identified by predictive risk protection module 103, as it proactively seeks out dormant risks.

After identifying the social entity, security analysis engine 101 may determine whether the social entity is a known entity, or is instead an unknown entity (203). If the social entity is a known entity, the security analysis engine 101 may compare the social risk score that is associated with the social entity in social risk database 104 to a social risk threshold that is associated with the user 106 (209), and may determine whether the social risk score exceeds the social risk threshold (211). If the social risk score that is associated with the social entity exceeds the social risk threshold that is associated with the user 106, the security analysis engine may initiate an appropriate security action (213). If, however, the social risk score that is associated with the social entity does not exceed the social risk threshold that is associated with the user 106, the security analysis engine may instead take no action.

If the social entity is an unknown entity, the security analysis engine 101 may analyze characteristics of the social entity, and/or of a target URL, file, or social communication that is associated with the social entity (205), in order to determine a social risk score (207). The security analysis engine 101 may generate an entry in the social risk database 104 that contains both the social risk score and one or more characteristics of the social entity and/or the target. The security analysis engine 101 may then compare the social risk score that is associated with the social entity to a social risk threshold that is associated with the user 106 (209), and may determine whether the social risk score exceeds the social risk threshold (211). If the social risk score that is associated with the social entity exceeds the social risk threshold that is associated with the user 106, the security analysis engine may initiate an appropriate security action (213). If, however, the social risk score that is associated with the social entity does not exceed the social risk threshold that is associated with the user 106, the security analysis engine may instead take no action.

Figure 3:
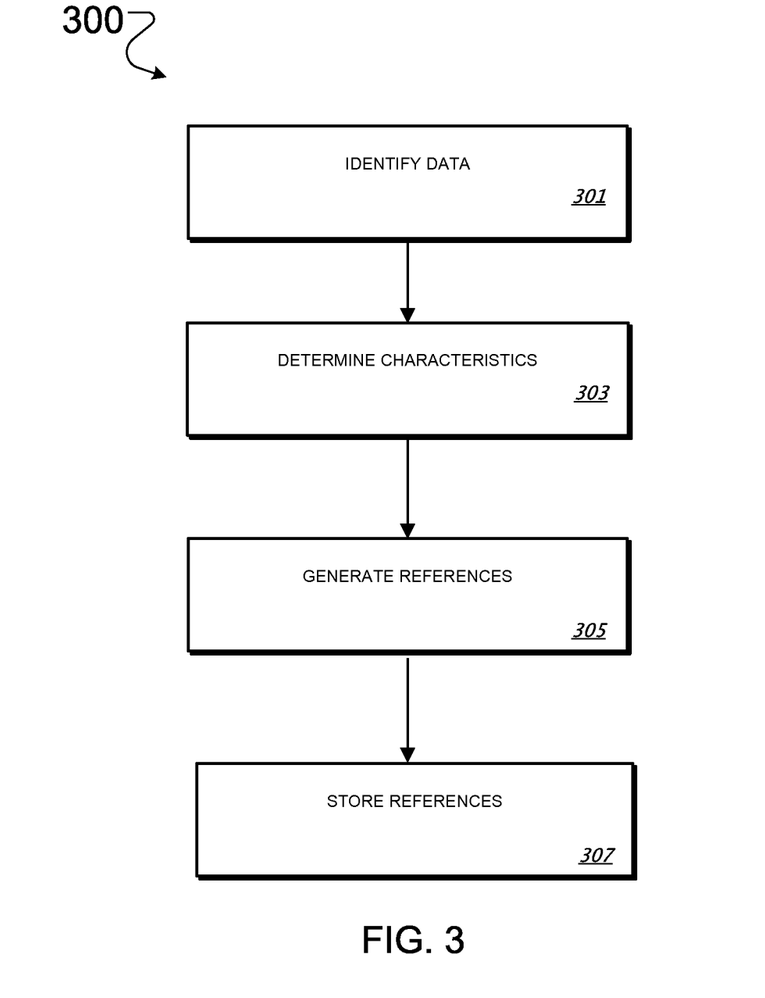
FIG. 3 is a flowchart of an example process for identifying data in a social network that is associated with a social entity.

FIG. 3 is a flowchart of a process 300 for identifying data in a social network that is associated with a social entity. The process 300 may be implemented, for example, using system 100, although other systems or configurations may be used. In such an implementation, one or more parts of the process may be executed by security analysis engine 101. In such an implementation, one or more parts of the process may be executed by security analysis engine 101, which may interface with other computers through a network. Security analysis engine 101 may identify and retrieve data involved in the process, such as data that is associated with a social entity, from one or more local or remote data sources, such as social network 105. Security analysis engine 101 may store data identified and retrieve in the process in one or more local or remote databases, such as social risk database 104.

The security analysis engine 101 may be configured to actively scan one or more social networks for data that is available and that pertains to a social entity, and may be further configured to receive additional data that is available from other sources.

A social entity may be, in some instances, a user of a social network, such as an individual or a corporation. John Doe, for example, may maintain a Facebook profile, in which case John Doe would be identified by security analysis engine 101 as a social entity, and information that is available through John Doe's profile, including pictures, textual content, and links, would be associated with John Doe. Similarly, if Acme, Inc., maker of fine widgets, maintains a Twitter account for purposes of public relations, Acme, Inc. would be identified by security analysis engine 101 as a social entity, and information tweeted by representatives of Acme, Inc. could be associated with both Acme, Inc. and its representatives. In some instances, however, a social entity may be an individual who has generated a fake profile page spoofing another social entity. For example, a malicious individual or bot could establish a second, fake, Acme, Inc. Twitter profile but, having been identified as a fake, the profile would be associated with the social entity that is the malicious individual or bot, rather than with Acme, Inc. In other instances, the social entity may be a software application that runs automated tasks in relation to a social network. A social network may harbor, for example, a malicious bot that is configured to maintain a social network profile for purposes of phising user data, or spreading computer viruses. The malicious bot would also be identified by security analysis engine 101 as a social entity, and information on or related to the malicious bot's profile would be associated with the malicious bot.

Data that is identified by security engine 101 through the process of scanning a social network may include, for example, information that is available through a social entity's profile, information that is available to security engine 101 by virtue of an agreement with the social entity, and information that is provided to security engine 101 by the social network or by another third party. A hyperlink that is associated with a social entity, for example, may be identified through the social entity's profile if the profile contains a reference to the hyperlink. The hyperlink may also be identified through a social network communication, such as a message, post, or tweet, if the social network communication is a source of the hyperlink.

The security engine 101 may be further configured to determine one or more characteristics of identified data. Characteristics of an identified hyperlink may include, for example, URL, network, destination content, domain, and host. Characteristics of identified content that is associated with a social entity, such as the text of a post by the social entity or associated files may include, for example, contextual, lexical, visual, or audio indicators. Security engine 101 may generate references to identified data, and to characteristics of identified data. Once generated, the references may be stored in, for example, social risk database, for later use by the security engine 101. The stored references may be used, for example, to evaluate and score a risk posed by a social entity.

Process 300 begins when a scanner identifies data on one or more social networks that is associated with a social entity (301). The scanner may be hosted at an entity that is different and separate from the security analysis engine 101. Alternatively, the scanner may be part of, or otherwise associated with, the security analysis engine 101, and may be integrated into the system 100 illustrated in FIG. 1.

Security engine 101 may, for example, actively scan social networks for publicly or authorized available information. Security engine 101 may additionally identify information that is associated with a social entity and that is received through an application programming interface (API). The type of data that is scanned from social networks may vary depending on the social network. For some social networks, security engine 101 may only have access to publicly available information, in which case the scan of the social network would be limited to identifying and/or acquiring this publicly available data. Other social networks may instead recognize security engine 101 as an authorized user (or as otherwise having elevated security status), and may therefore provide security engine 101 with access to additional information that is not available to the general public. The different social networks may contain different types of data associated with a user profile. The security engine 101 accesses each social network for only data that is available for that network. The security engine 101 would not request data from a social network that is not maintained by the social network. For example, the security engine may scan a LinkedIn profile, instead of a Twitter profile, for employment information.

Security engine 101 may be configured to scan for only a subset of the data that is available on or through a social network. Scanning may be limited, for example, to popular pages or user profiles on a social network, such as popular Facebook profiles, and/or popular Twitter hash tags. Security engine 101 may also be configured to scan social networks for any information associated with a particular individual, enterprise, or company. Security engine 101 may, for example, be configured to scan the LinkedIn profiles of all employees of Acme, Inc. In some implementations, the system may constantly scan one or more social networks for data. In other implementations, the system may only scan during a set time period.

The security engine 101 may determine one or more characteristics of identified data (303). Characteristics that may be determined for identified data may vary depending on the type of data. Identified data that is associated with a social entity may include, for example, the social entity's user name, history, contacts, and associated links and content. For an individual, the identified data may also include demographic information such as age, gender, location, and place of employment. Characteristics of a post may include, for example, language, timestamp, URL, domain or other information and metadata.

In some instances, identified data may include data that is correlated. Audio/visual (A/V) content data and textual data may, for example, be correlated in an instance in which the text describes the A/V data. In another example, content data may be a URL to a link the text data may include a user profile that is associated with the link. For example, the identified data may include a link to the Acme, Inc. website that was posted by John Doe, an avid fan or detractor of Acme, Inc. In this example, the posted content or the link to the Acme, Inc. website may be determined to be characteristics of the identified data, in addition to characteristics that include correlations between data identified from John Doe's profile.

Following determination of the characteristics of the identified data, security engine 101 may generate, for each of the one or more characteristics, a reference to the characteristic or to the identified data to which the characteristic pertains (305). Security engine 101 may, for instance, create a reference to a characteristic by tagging the characteristic. The characteristic may be tagged, for example, with a keyword or term that describes the characteristic.

Security engine 101 may store references to identified data in one or more databases for later analysis (307). References to identified data that is associated with a social entity may be stored, for example, in social risk database 104, and may later be accessed to generate a social risk score for the social entity. Storage of references to identified data rather than the identified data itself may minimize the amount of memory needed to assess and to act on risks posed by social entities. In some implementations, however, both references to identified data and the identified data itself may be stored. In some implementations, all references to the one or more characteristics of the identified data associated with the social entity are stored while, in others, only a select group of references are stored.

Various implementations of the systems and techniques described here can be realized in digital electronic circuitry, integrated circuitry, specially designed ASICs (application specific integrated circuits), computer hardware, firmware, software, and/or combinations thereof. These various implementations can include implementation in one or more computer programs that are executable and/or interpretable on a programmable system including at least one programmable processor, which may be special or general purpose, coupled to receive data and instructions from, and to transmit data and instructions to, a storage system, at least one input device, and at least one output device.

These computer programs (also known as programs, software, software applications or code) include machine instructions for a programmable processor, and can be implemented in a high-level procedural and/or object-oriented programming language, and/or in assembly/machine language. As used herein, the terms "machine-readable medium" "computer-readable medium" refers to any computer program product, apparatus and/or device (e.g., magnetic discs, optical disks, memory, Programmable Logic Devices (PLDs)) used to provide machine instructions and/or data to a programmable processor, including a machine-readable medium that receives machine instructions as a machine-readable signal. The term "machine-readable signal" refers to any signal used to provide machine instructions and/or data to a programmable processor.

To provide for interaction with a user, the systems and techniques described here can be implemented on a computer having a display device (e.g., a CRT (cathode ray tube) or LCD (liquid crystal display) monitor) for displaying information to the user and a keyboard and a pointing device (e.g., a mouse or a trackball) by which the user can provide input to the computer. Other kinds of devices can be used to provide for interaction with a user as well; for example, feedback provided to the user can be any form of sensory feedback (e.g., visual feedback, auditory feedback, or tactile feedback); and input from the user can be received in any form, including acoustic, speech, or tactile input.

The systems and techniques described here can be implemented in a computing system that includes a back end component (e.g., as a data server), or that includes a middleware component (e.g., an application server), or that includes a front end component (e.g., a client computer having a graphical user interface or a Web browser through which a user can interact with an implementation of the systems and techniques described here), or any combination of such back end, middleware, or front end components. The components of the system can be interconnected by any form or medium of digital data communication (e.g., a communication network). Examples of communication networks include a local area network ("LAN"), a wide area network ("WAN"), and the Internet.

The computing system can include clients and servers. A client and server are generally remote from each other and typically interact through a communication network. The relationship of client and server arises by virtue of computer programs running on the respective computers and having a client-server relationship to each other.

A number of implementations have been described. Nevertheless, it will be understood that various modifications may be made without departing from the spirit and scope of the disclosure.

In addition, logic flows depicted in the figures do not require the particular order shown, or sequential order, to achieve desirable results. In addition, other steps may be provided, or steps may be eliminated, from the described flows, and other components may be added to, or removed from, the described systems. Accordingly, other implementations are within the scope of the following claims.

Elements of different implementations described herein may be combined to form other implementations not specifically set forth above. Elements may be left out of the processes, computer programs, Web pages, etc. described herein without adversely affecting their operation. Furthermore, various separate elements may be combined into one or more individual elements to perform the functions described herein.

Other implementations not specifically described herein are also within the scope of the following claims.

What is claimed is:

1. A method comprising:
   scanning data that is maintained on multiple social networks, wherein scanning comprises identifying, by one or more processors, data that is associated with a social entity;
   wherein, scanning data is performed on a continuous basis, without user initiation;
   determining one or more characteristics of the identified data;
   generating, for each of the one or more characteristics, a reference to the identified data that indicates the characteristic;
   storing one or more references to the identified data in one or more databases that are accessible to a security analysis engine;
   algorithmically comparing the one or more generated references to one or more known references, wherein the one or more known references are references to characteristics of identified data that have been assigned a level of risk, and wherein the one or more known references are stored in the one or more databases accessible to the security analysis engine;
   determining, a social risk score for the social entity, based on the algorithmic comparison;
   comparing the social risk score for the social entity to a social risk threshold;
   initiating a security action if the social risk score exceeds the social risk threshold, wherein initiating the security action comprises providing an alert to a user whose profile is spoofed by the social entity.

2. The method of claim 1 wherein the one or more known references to characteristics of identified data that have been assigned a level of risk, are assigned the level of risk by the security analysis engine.

3. The method of claim 1, wherein identifying an association between the social entity and the identified data comprises identifying that the associated data originated with, or was supplied, created, or referenced by, the social entity.

4. The method of claim 1, wherein the one or more characteristics of the data are selected from the group consisting of contextual, lexical, visual, audio, profile, URL, network, destination content, domain, host, and application characteristics.

5. The method of claim 1 further comprising:
   receiving data associated with the social entity from a third party.

6. The method of claim 5, wherein receiving data associated with the social entity comprises receiving data through an application programming interface (API).

7. The method of claim 1, further comprising detecting an action by the social entity, wherein the social risk score for the social entity is compared to the social risk threshold in response to detecting the action by the social entity.

8. The method of claim 1, further comprising determining that the social entity is an unknown social entity, wherein the social risk score for the social entity is compared to the social risk threshold in response to determining that the social entity is an unknown social entity.

9. The method of claim 1 wherein the one or more references to the identified data are stored separately from the identified data.

10. The method of claim 1 wherein scanning data that is maintained on multiple social networks comprises scanning data that is maintained on a first social network and data that is maintained on a second social network.

11. A system comprising:
    one or more processing devices; and
    one or more non-transitory computer-readable media coupled to the one or more processing devices having instructions stored thereon which, when executed by the one or more processing devices, cause the one or more processing devices to perform operations comprising:
    scanning data that is maintained on multiple social networks, wherein scanning comprises identifying, by one or more processors, data that is associated with a social entity;
    wherein, scanning data is performed on a continuous basis, without user initiation;
    determining one or more characteristics of the identified data;
    generating, for each of the one or more characteristics, a reference to the identified data that indicates the characteristic;

storing one or more references to the identified data in one or more databases that are accessible to a security analysis engine;

algorithmically comparing the one or more generated references to one or more known references, wherein the one or more known references are references to characteristics of identified data that have been assigned a level of risk, and wherein the one or more known references are stored in the one or more databases accessible to the security analysis engine;

determining, a social risk score for the social entity, based on the algorithmic comparison;

comparing the social risk score for the social entity to a social risk threshold;

initiating a security action if the social risk score exceeds the social risk threshold, wherein initiating the security action comprises providing an alert to a user whose profile is spoofed by the social entity.

12. The system of claim 11 wherein the one or more known references to characteristics of identified data that have been assigned a level of risk, are assigned the level of risk by the security analysis engine.

13. The system of claim 11, wherein identifying an association between the social entity and the identified data comprises identifying that the associated data originated with, or was supplied, created, or referenced by, the social entity.

14. The system of claim 11, wherein the one or more characteristics of the data are selected from the group consisting of contextual, lexical, visual, audio, profile, URL, network, destination content, domain, host, and application characteristics.

15. The system of claim 11 further comprising:
receiving data associated with the social entity from a third party.

16. The system of claim 11, wherein receiving data associated with the social entity comprises receiving data through an application programming interface (API).

17. A non-transitory computer-readable storage device encoded with a computer program, the program comprising instructions that when executed by a data processing apparatus cause the data processing apparatus to perform operations comprising:

scanning data that is maintained on multiple social networks, wherein scanning comprises identifying, by one or more processors, data that is associated with a social entity;

wherein, scanning data is performed on a continuous basis, without user initiation;

determining one or more characteristics of the identified data;

generating, for each of the one or more characteristics, a reference to the identified data that indicates the characteristic;

storing one or more references to the identified data in one or more databases that are accessible to a security analysis engine;

algorithmically comparing the one or more generated references to one or more known references, wherein the one or more known references are references to characteristics of identified data that have been assigned a level of risk, and wherein the one or more known references are stored in the one or more databases accessible to the security analysis engine;

determining, a social risk score for the social entity, based on the algorithmic comparison;

comparing the social risk score for the social entity to a social risk threshold;

initiating a security action if the social risk score exceeds the social risk threshold, wherein initiating the security action comprises providing an alert to a user whose profile is spoofed by the social entity.

18. The medium of claim 17 wherein the one or more known references to characteristics of identified data that have been assigned a level of risk, are assigned the level of risk by the security analysis engine.

* * * * *